US006801898B1

(12) United States Patent
Koezuka

(10) Patent No.: US 6,801,898 B1
(45) Date of Patent: Oct. 5, 2004

(54) TIME-SCALE MODIFICATION METHOD AND APPARATUS FOR DIGITAL SIGNALS

(75) Inventor: Shinji Koezuka, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/564,201

(22) Filed: May 4, 2000

(30) Foreign Application Priority Data

May 6, 1999 (JP) .......................................... 11-126343

(51) Int. Cl.[7] ............................................... G01L 19/00

(52) U.S. Cl. ....................................... 704/500; 704/503

(58) Field of Search ................................ 704/216, 218, 704/213, 500, 503, 200, 211, 207

(56) References Cited

U.S. PATENT DOCUMENTS

| | | | | | |
|---|---|---|---|---|---|
| 5,749,064 | A | * | 5/1998 | Pawate et al. | 704/213 |
| 5,842,172 | A | * | 11/1998 | Wilson | 704/503 |
| 5,845,247 | A | * | 12/1998 | Miyasaka | 704/267 |
| 6,049,766 | A | * | 4/2000 | Laroche | 704/216 |
| 6,169,240 | B1 | | 1/2001 | Suzuki | 84/605 |
| 6,169,241 | B1 | | 1/2001 | Shimizu | 84/605 |
| 6,207,885 | B1 | | 3/2001 | Nogami et al. | 84/636 |
| 6,232,540 | B1 | | 5/2001 | Kondo | 84/612 |
| 6,484,137 | B1 | * | 11/2002 | Taniguchi et al. | 704/211 |
| 6,487,536 | B1 | | 11/2002 | Koezuka et al. | 704/500 |

FOREIGN PATENT DOCUMENTS

| | | |
|---|---|---|
| JP | 1093795 | 4/1989 |
| JP | 5273964 | 10/1993 |
| JP | 6175663 | 6/1994 |
| JP | 9034448 | 2/1997 |
| JP | 9062257 | 3/1997 |
| JP | 10282963 | 10/1998 |

* cited by examiner

*Primary Examiner*—Daniel Abebe
(74) *Attorney, Agent, or Firm*—Pillsbury Winthrop LLP

(57) ABSTRACT

According to a time-scale modification method or apparatus, wave segments each having a prescribed cutting length are sequentially cut from original digital signal waves stored in a waveform memory and are then spliced together by way of cross-fading, so it is possible to realize time-scale modification (i.e., compression or expansion with respect to time) in accordance with a designated time-scale modification factor. Herein, time-scale modification parameters such as a cross-fade duration, a search start time and a search end time are produced in response to the designated time-scale modification factor. In addition, a cutting start position is used for cutting a next wave segment following a present wave segment. The cutting start time is determined within a period of time between the search start time and search end time in such a way that it is placed to provide a best similarity between the wave segments having prescribed portions which are connected with each other by way of cross-fading. Specifically, a back-end portion of the present wave segment and a top portion of the next wave segment are smoothly connected together by way of the cross-fading, wherein they have the same cross-fade duration. The cross-fade duration is controlled to be longer as the time-scale modification factor becomes greater or smaller than "1". The cross-fading is actualized by a window function having different cross-fade coefficients, which are varied over a lapse of time and by which data of the prescribed portions of the wave segments are multiplied and mixed together.

28 Claims, 8 Drawing Sheets

FIG. 2A
FIG. 2B
FIG. 2C
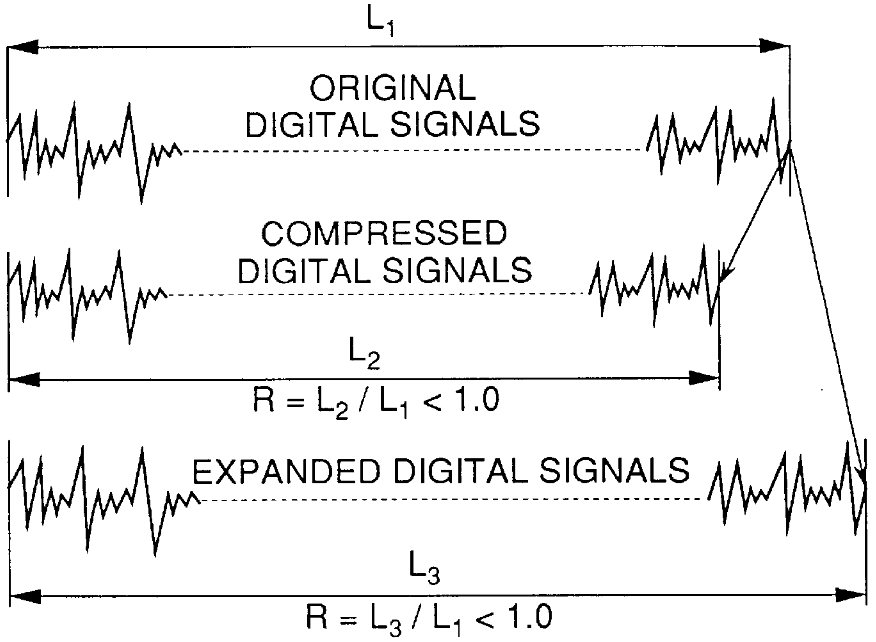
FIG. 7A
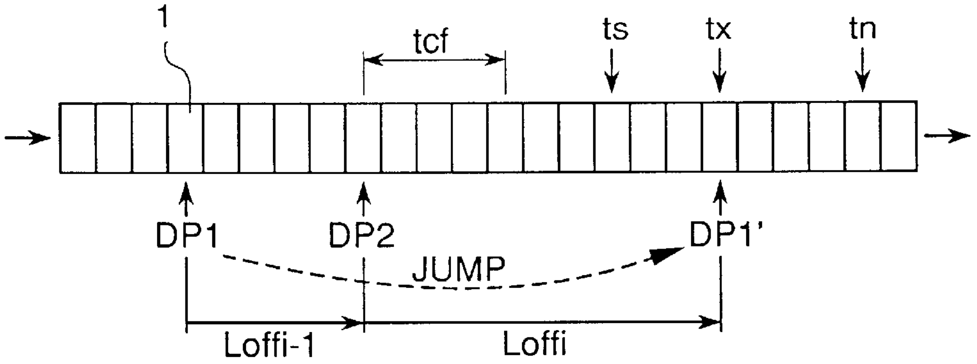
FIG. 7B
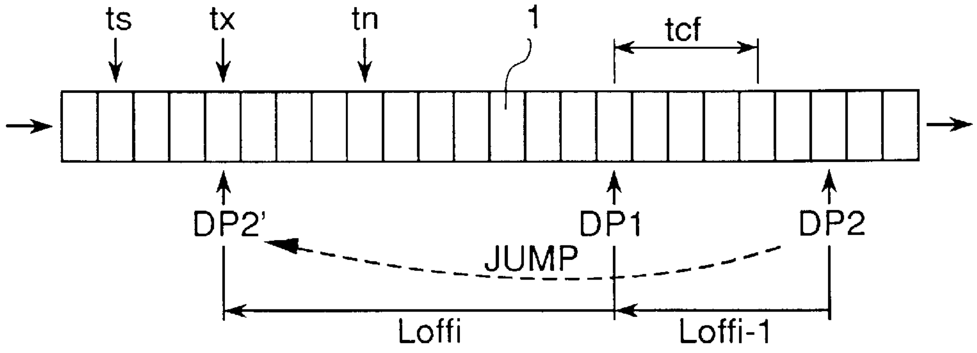

TIME-SCALE MODIFICATION METHOD AND APPARATUS FOR DIGITAL SIGNALS

BACKGROUND OF THE INVENTION

1. Field of the Invention

This invention relates to time-scale modification methods and apparatuses that perform time-scale modification on digital signals without changing original pitches in accordance with time-scale modification factors.

This application is based on Patent Application No. Hei 11-126343 filed in Japan, the content of which is incorporated herein by reference.

2. Description of the Related Art

Conventionally, engineers and scientists propose time-scale modification techniques to compress or expand digital audio signals with respect to time without changing original pitches. For example, those techniques are used for the so-called "scale adjustment", in which an overall recording time for recording digital audio signals is adjusted to a prescribed time, and "tempo modification" used by Karaoke devices. A cut-and-splice method is conventionally known as one kind of the time-scale modification techniques. According to this method whose operations are shown in FIGS. 9A, 9B, original digital audio signals S having waveforms (or envelopes) are sequentially divided into and cut to wave segments having prescribed time lengths, so that the wave segments are spliced together. Herein, discontinuity is caused to occur at joints at which the wave segments are jointed together. To eliminate the discontinuity, cross-fade processes are effected on the joints between the wave segments so that the wave segments are being smoothly connected together. A time-scale modification factor R is expressed by an equation (1), as follows:

$$R = \frac{Ls}{Ls + Loff} \tag{1}$$

where Ls denotes a cutting length used for cutting original waves, and Loff denotes an offset length which lies between a back-end portion of a wave segment being cut and its next wave segment.

FIG. 9A shows an example of time-scale expansion, wherein the offset length Loff has a negative value, so that R>1. FIG. 9B shows an example of time-scale compression, wherein the offset length Loff has a positive value, so that R<1. Therefore, when certain values are given as the time-scale modification factor R and cutting length Ls respectively, the offset length Loff is calculated directly from an equation (2), as follows:

$$Loff = \frac{1-R}{R} \cdot Ls \tag{2}$$

According to the conventional time-scale modification techniques, wave segments are spliced together at prescribed positions corresponding to the offset length Loff, which is determined and set in response to the time-scale modification factor, regardless of conditions of the waves. For this reason, although the cross-fade processes are effected on joints of the wave segments, phase deviations are caused to occur at the joints of the wave segments. This causes deterioration of sound quality in reproduction of sounds which are reproduced by way of time-scale modification.

SUMMARY OF THE INVENTION

It is an object of the invention to provide a time-scale modification method or apparatus which is capable of compressing or expanding digital signals in accordance with desired time-scale modification factors without causing deterioration in sound quality at joints of wave segments, which are cut from original waves of the digital signals and are spliced together.

According to a time-scale modification method or apparatus of this invention, wave segments each having a prescribed cutting length are sequentially cut from original digital signal waves stored in a waveform memory and are then spliced together by way of cross-fading, so it is possible to realize time-scale modification (i.e., compression or expansion with respect to time) in accordance with a designated time-scale modification factor. Herein, time-scale modification parameters such as a cross-fade duration, a search start time and a search end time are produced in response to the designated time-scale modification factor. In addition, a cutting start position is used for cutting a next wave segment following a present wave segment. The cutting start position is determined within a period of time between the search start time and search end time in such a way that it is placed to provide a best similarity between the wave segments having prescribed portions which are connected with each other by way of cross-fading. Specifically, a back-end portion of the present wave segment and a top portion of the next wave segment are smoothly connected together by way of the cross-fading, wherein they have the same cross-fade duration. The cross-fade duration is controlled to be longer as the time-scale modification factor becomes greater or smaller than "1". The cross-fading is actualized by a window function having different cross-fade coefficients, which are varied over a lapse of time and by which data of the prescribed portions of the wave segments are multiplied and mixed together.

Thus, it is possible to provide smooth connections between the wave segments which are cut to provide the best similarity and are spliced together by way of the cross-fading, so it is possible to actualize advanced time-scale modification in which sound quality is not deteriorated so much at joints of the wave segments in reproduced sounds.

BRIEF DESCRIPTION OF THE DRAWINGS

These and other objects, aspects and embodiment of the present invention will be described in more detail with reference to the following drawing figures, of which:

FIG. 2A shows an example of original digital signals;

FIG. 2B shows an example of compressed digital signals being compressed from the original digital signals of FIG. 2A;

FIG. 2C shows an example of expanded digital signals being expanded from the original digital signals of FIG. 2A;

FIG. 7A is a simplified diagram which is used to explain movements of pointers in a waveform memory shown in FIG. 1 in accordance with time-scale compression;

FIG. 7B is a simplified diagram which is used to explain movements of pointers in the waveform memory in accordance with time-scale expansion;

DESCRIPTION OF THE PREFERRED EMBODIMENT

This invention will be described in further detail by way of examples with reference to the accompanying drawings.

Figure 1:
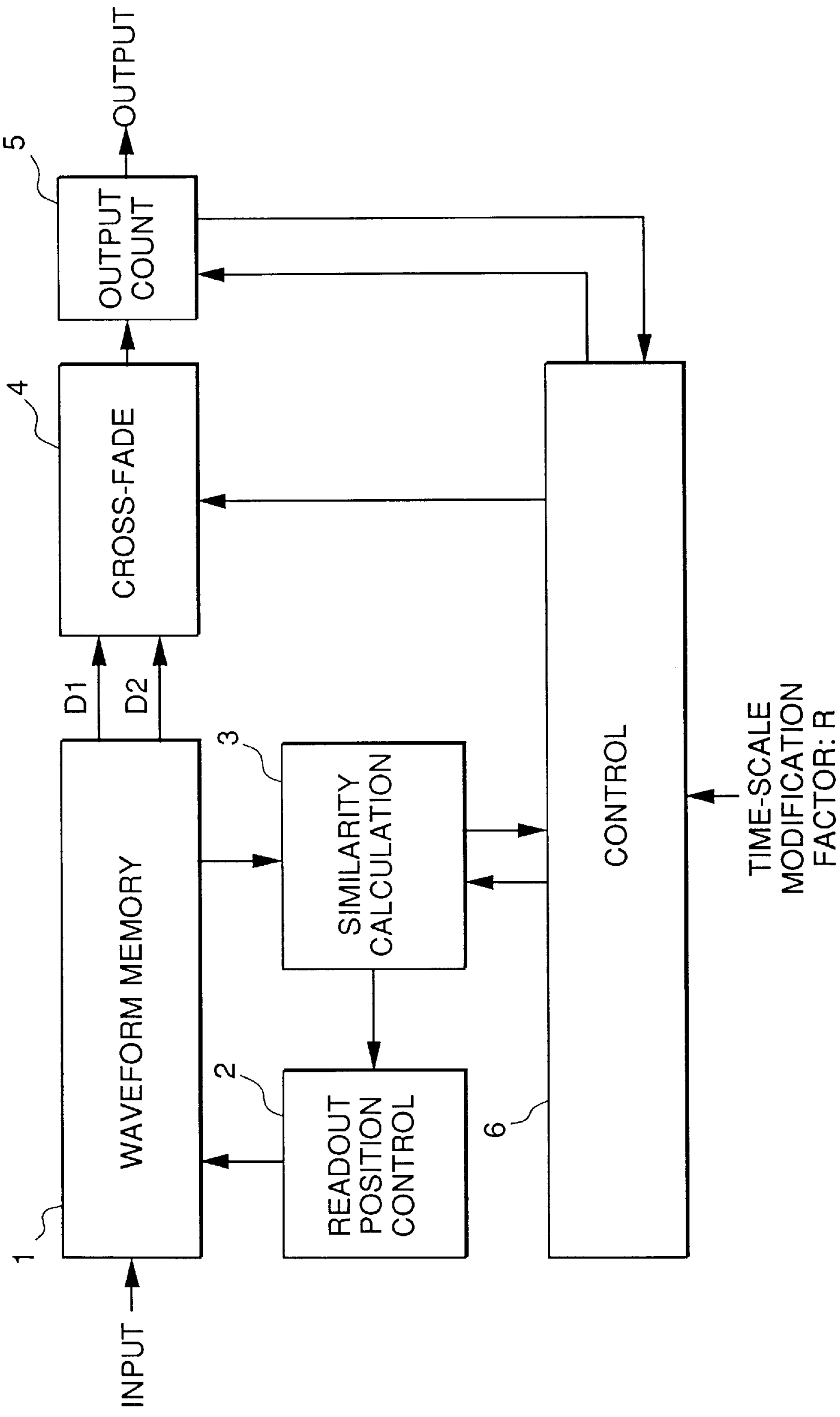
FIG. 1 is a block diagram showing a configuration of a time-scale modification apparatus in accordance with preferred embodiment of the invention.

FIG. 1 is a block diagram showing a configuration of a time-scale modification apparatus in accordance with the preferred embodiment of the invention.

Original digital audio signals (i.e., subjects on which time-scale modification is being effected) are sequentially stored in a waveform memory 1. The waveform memory 1 is configured by a ring buffer having a certain storage capacity for storing an amount of digital audio signals which are needed for searching cutting start positions on waves. Herein, various cutting start positions are detected from the digital audio signals stored in the waveform memory 1. So, prescribed amounts of data corresponding to prescribed data lengths are sequentially read from the waveform memory 1 in connection with the various cutting start positions under control of a readout position control section 2. A similarity calculation section 3 calculates similarities between waves, which are subjected to cross-fading in a duration within a period of time between a search start time and a search end time which are determined in advance. It produces a cutting start position corresponding to a highest similarity, in other words, a smallest amount of errors. That is, the similarity calculation section 3 produces information representing a readout position corresponding to the highest similarity. Based on the information, the readout position control section 2 controls readout positions of two data being read from the waveform memory 1. That is, two data D1, D2 are read from the waveform memory 1 and are supplied to a cross-fade section 4, wherein they are subjected to cross-fade process. Then, cross-faded data are output by way of an output count section 5 as output signals which are expanded with respect to time as compared with the original input signals. The output count section 5 counts a number of data included in the output signals. A control section 6 determines a cross-fade duration and a search range defined between the search start time and search end time on the basis of a time-scale modification factor R, which is designated by an external device or system (not shown). In addition, the control section 6 determines cutting data lengths based on the cutting start positions produced by the similarity calculation section 3. Namely, the control section 6 sets a prescribed cutting start position to the output count section 5, so that the output count section 5 counts a number of the cutting data lengths that emerge in outputs of the cross-fade section 4. So, when counting a cutting data length being set by the control section 6, the output count section 5 controls several sections to execute a search for searching a next cutting position on waves corresponding to the digital audio signals stored in the waveform memory 1.

Next, operations of the time-scale modification apparatus of FIG. 1 will be described in detail.

First, the time-scale modification factor R will be described with reference to FIGS. 2A to 2C. Herein, if original digital signals have a length L1 (see FIG. 2A) and output digital signals have a length L2 (see FIG. 2B, where L2<L1), a time-scale modification factor R is calculated as follows:

$$R = \frac{L2}{L1}$$

In the above, $R<1.0$, so the output digital signals of FIG. 2B correspond to "compressed" digital data which are compressed with respect to time as compared with the original digital signals. If output digital signals have a length L3 (see FIG. 2C, where L3>L1), a time-scale modification factor R becomes greater than 1.0, as follows:

$$R = \frac{L3}{L1} > 1.0$$

Thus, the output digital signals of FIG. 2C correspond to "expanded" digital signals, which are expanded with respect to time as compared with the original digital signals. According to the aforementioned scale adjustment, the original digital signals are compressed or expanded in time scale to match with a recording time of the output digital signals. Hence, it is possible to determine a time-scale modification factor R based on an original recording time of the original digital signals and a target recording time for recording the output digital signals.

Figures 3A, 3B, 3C, 3D, 3E:
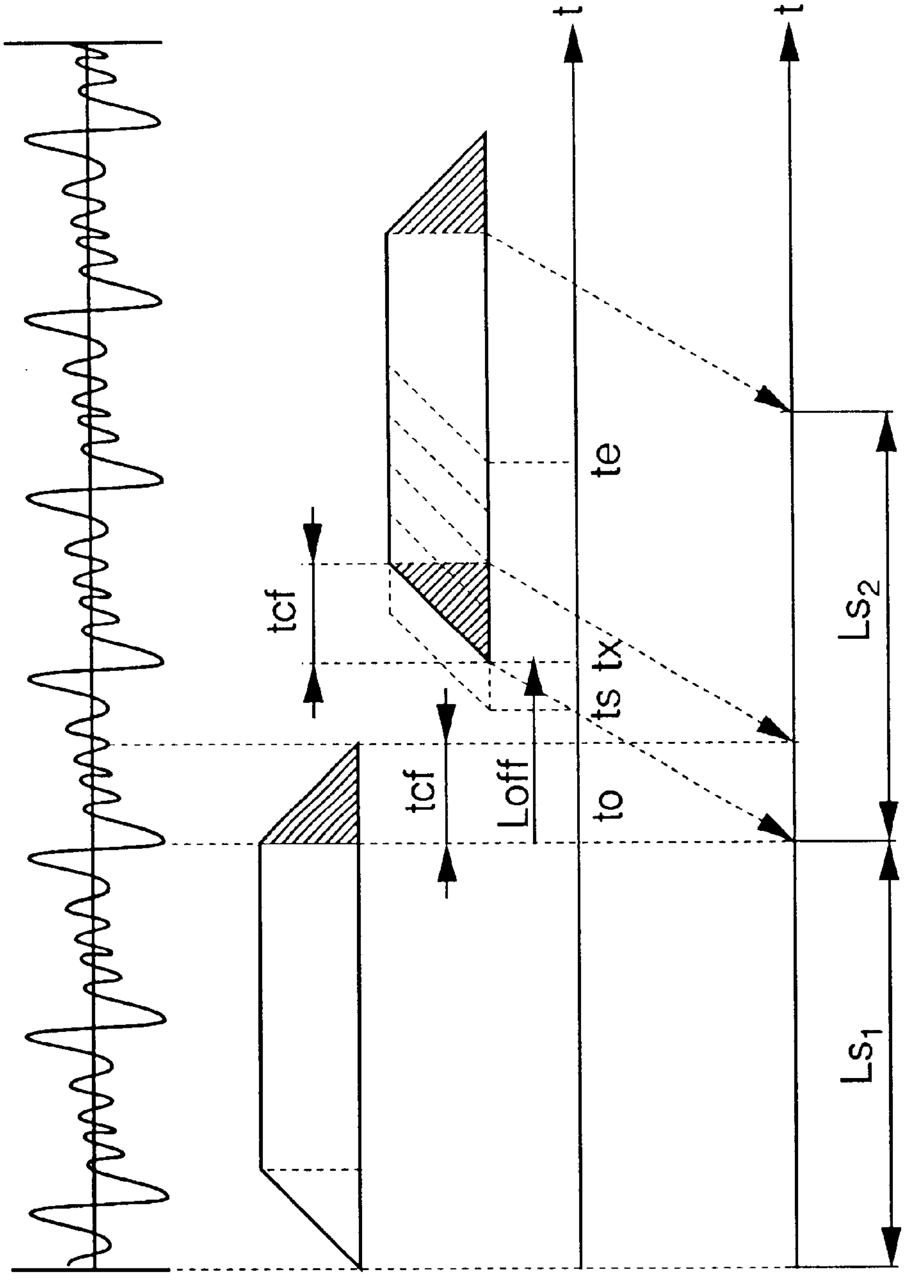
FIG. 3A shows digital signals having waves which are subjected to time-scale compression.
FIG. 3B shows data of a present wave segment being cut from the waves of the digital signals shown in FIG. 3A.
FIG. 3C shows data of a next wave segment being cut from the waves of the digital signals shown in FIG. 3A.
FIG. 3D shows an original time scale related to the digital signals of FIG. 3A.
FIG. 3E shows a time scale used for representation of the time-scale compression.
Figures 4A, 4B, 4C, 4D, 4E:
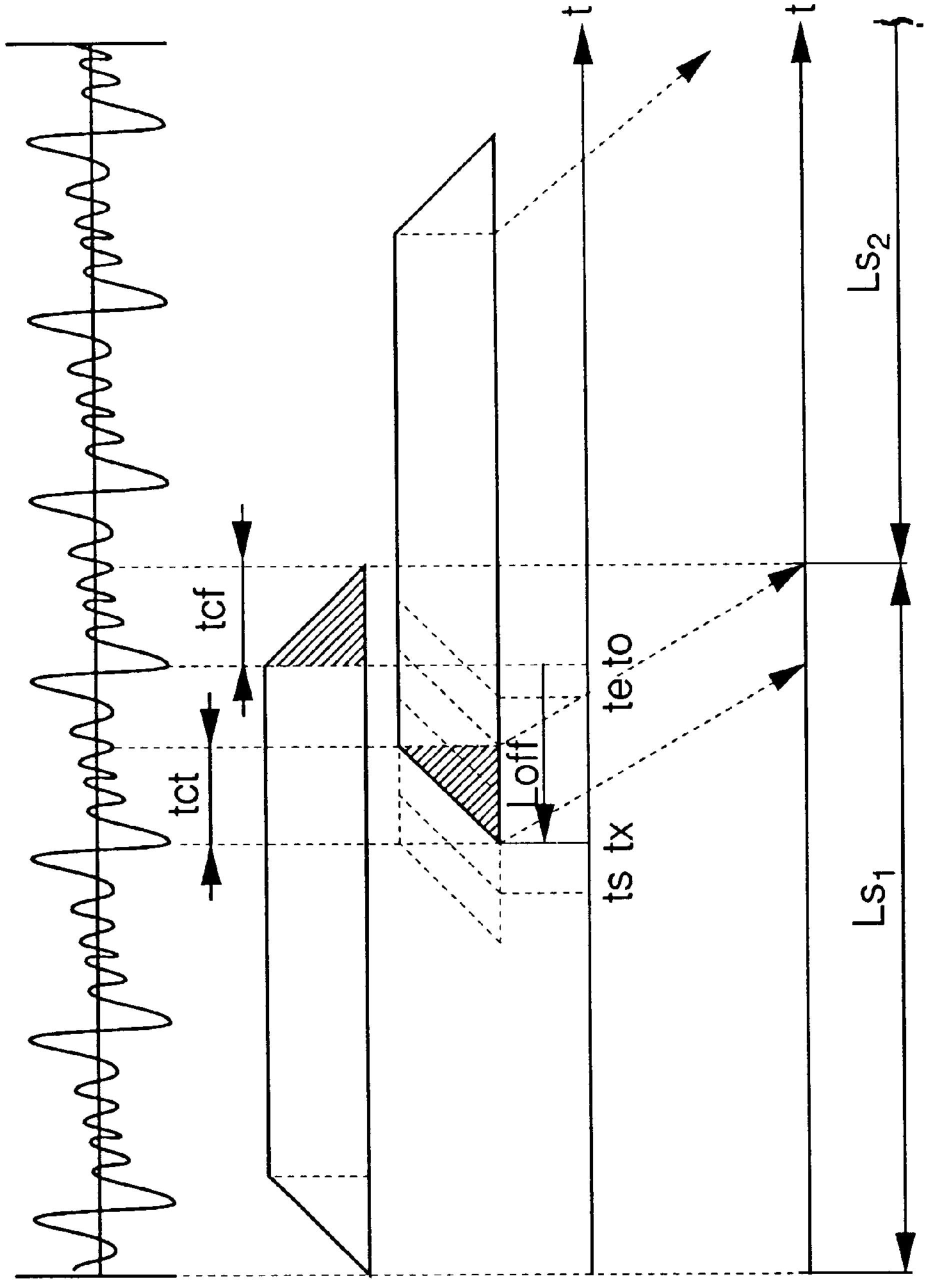
FIG. 4A shows digital signals having waves which are subjected to time-scale expansion.
FIG. 4B shows data of a present wave segment being cut from the waves of the digital signals shown in FIG. 4A.
FIG. 4C shows data of a next wave segment being cut from the waves of the digital signals shown in FIG. 4A.
FIG. 4D shows an original time scale related to the digital signals of FIG. 4A.
FIG. 4E shows a time scale used for representation of the time-scale expansion.

As described before in connection with the equation (1), the time-scale modification factor R can be expressed using the cutting length Ls and the offset length Loff being measured between a back-end portion of a cut wave segment and a top portion of a next wave segment being cut. Therefore, even if the offset length Loff is changed, it is possible to maintain a certain value of the time-scale modification factor R by correspondingly changing the cutting length Ls in response to the changed offset length. The present embodiment actualizes time-scale compression as shown in FIGS. 3A–3E and time-scale expansion as shown in FIGS. 4A–4E. In the case of the time-scale compression, a present wave segment whose data are shown in FIG. 3B and a next wave segment whose data are shown in FIG. 3C are being sequentially cut from original digital signals having waves shown in FIG. 3A, wherein they are related to each other on an original time scale shown in FIG. 3D and are compressed on a time scale shown in FIG. 3E. In the case of the time-scale expansion, a present wave segment whose data are shown in FIG. 4B and a next wave segment whose data are shown in FIG. 4C are being sequentially cut from original digital signals having waves shown in FIG. 4A, wherein they are related to each other on an original time scale shown in FIG. 4D and are expanded on a time scale shown in FIG. 4E. In each of the aforementioned cases, a top portion of the next wave segment is gradually changed from a search start time ts to a search end time te, which are determined in advance. Herein, the present wave segment has a back-end portion (see hatched portion shown in FIG. 3B or FIG. 4B) corresponding to a cross-fade duration tcf, while the next wave segment has a top portion (see hatched portion shown in FIG. 3C or FIG. 4C) corresponding to the cross-fade duration tcf Similarities are calculated and examined between those portions while the top portion of the next wave segment is changed from the search start time ts to the search end time te. Herein, the present embodiment produces a cutting start position tx corresponding to a best similarity being established between the back-end portion of the present wave segment and the top portion of the next wave segment. Thus, the present embodiment determines to cut the next wave segment from the cutting start position tx. Incidentally, it is possible to calculate a similarity S(x) for cross-fading waves in response to the cutting start position tx used for cutting the next wave segment, in accordance with an equation (3) using a square sum of errors, as follows:

$$S(x) = \sum_{i=0}^{tcf} \{D(t0+i) - D(tx+i)\}^2 \tag{3}$$

Of course, the aforementioned equation shows merely an example of similarity calculation. Hence, it is possible to produce the similarity S(x) in accordance with other calculations such as an absolute sum of errors.

Once the cutting start position tx is determined, a cutting length used for cutting the next wave segment is being determined. That is, by using an offset length $Loff_{i-1}$ being determined with a serial number "i-1", it is possible to calculate a length Lsi for a next wave segment being cut in accordance with an equation (4), as follows:

$$Lsi = \frac{R}{1-R} \cdot Loff_{i-1} \tag{4}$$

where R≠1.

In the above equation, time-scale compression is designated when $Loff_{i-1}>0$, while time-scale expansion is designated when $Loff_{i-1}<0$.

Incidentally, the cutting length Ls is not necessarily set by the aforementioned equation. That is, it is preferable that the cutting length Ls does not become shorter than a minimal cutting length Lsmin, which is preset in advance. For example, the minimal cutting length Lsmin is set at 20 milli-second in response to a lowest frequency of 50 Hz. In addition, 20 milli-second is set to a search range ts-te. Concretely speaking, the search start time ts is set at 5 milli-second, and the search end time te is set at 25 milli-second, for example.

As the time-scale modification factor R becomes greatly different from "1", in other words, as the time-scale compression factor (or time-scale expansion factor) becomes very small (or very large), similarities between original digital signals and output digital signals become small. In that case, the output digital signals become "un-natural" on the auditory sense at joints of wave segments which are spliced together. For this reason, it is preferable to adaptively change the optimal cross-fade duration tcf as the time-scale modification factor R is changed to depart from "1". Concretely speaking, in the case of a compression factor of 50% or an expansion factor of 200%, for example, approximately 50% of the cutting length Lsi is set as the cross-fade duration tcf. Then, as the factor is increased or decreased to approach 100%, a ratio of the cross-fade duration tcf against the cutting length Lsi is gradually reduced to 0%.

It takes a considerable time to perform similarity calculations if the cross-fade duration tcf is relatively long. In that case, it is possible to change a step time (e.g., a number of samples), by which the similarity calculation is being executed, in response to the cross-fade duration tcf. For example, similarities are calculated per every three to five samples to cope with the compression factor of 50% or expansion factor of 200%, so that data of wave segments are compared with each other in similarities per every three to five samples. Then, as the factor is increased or decreased to approach 100%, a number of samples for comparison of the data is gradually reduced to one sample. In order to detect similarities between cross-fading waves, it is necessary to detect correlation between pitch waves, which are accompanied with large variations in amplitude levels. In other words, it is unnecessary to detect the correlation in consideration of wave portions whose variations are small. Therefore, it can be said that the aforementioned processing (i.e., gradually decreasing the number of the samples for the comparison of the data of the wave segments) do not produce great differences in calculation results.

Figure 5:
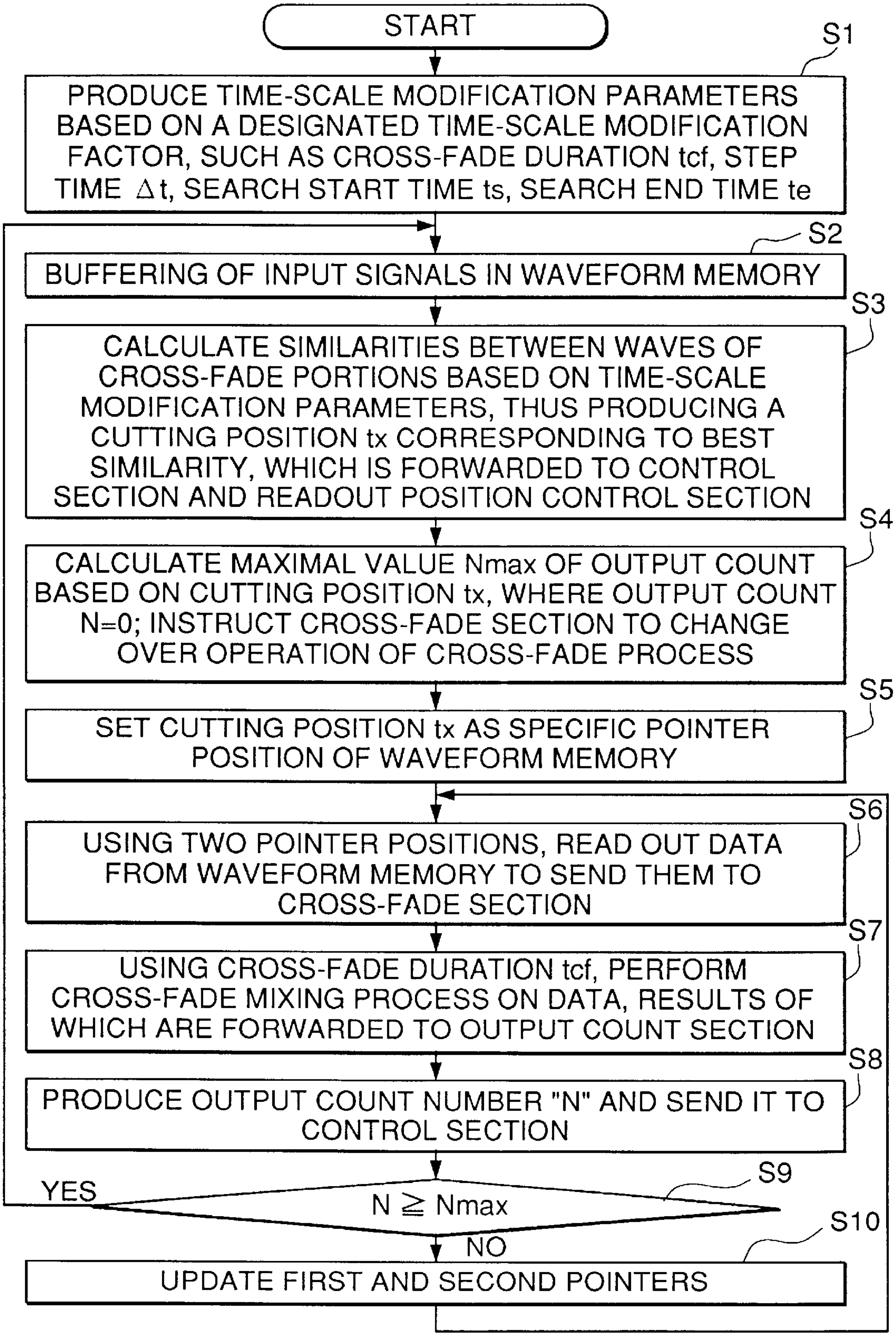
FIG. 5 is a flowchart showing procedures of a time-scale modification process being performed by the time-scale modification apparatus of FIG. 1.

FIG. 5 is a flowchart showing procedures of time-scale modification processing being executed on digital signals by the time-scale modification apparatus of the present embodiment.

In step S1, the control section 6 produces time-scale modification parameters based on a time-scale modification factor R, which is given from the external (i.e., external device or system, not shown). The time-scale modification parameters include a cross-fade duration tcf, a step time Δt for similarity calculation, a search start time ts and a search end time te. In step S2, the waveform memory 1 loads a certain amount of data of original digital signal waves, which are needed for search of cutting positions.

Based on the time-scale modification parameters produced by the step S1, the similarity calculation section 3 calculates similarities with respect to cross-fade portions in the original digital signal waves in step S3. Herein, the similarity calculation section 3 detects a cutting start position tx corresponding to a best similarity (or a smallest value of S), which is forwarded to the control section 6 and the readout position control section 2 respectively.

Figure 6:
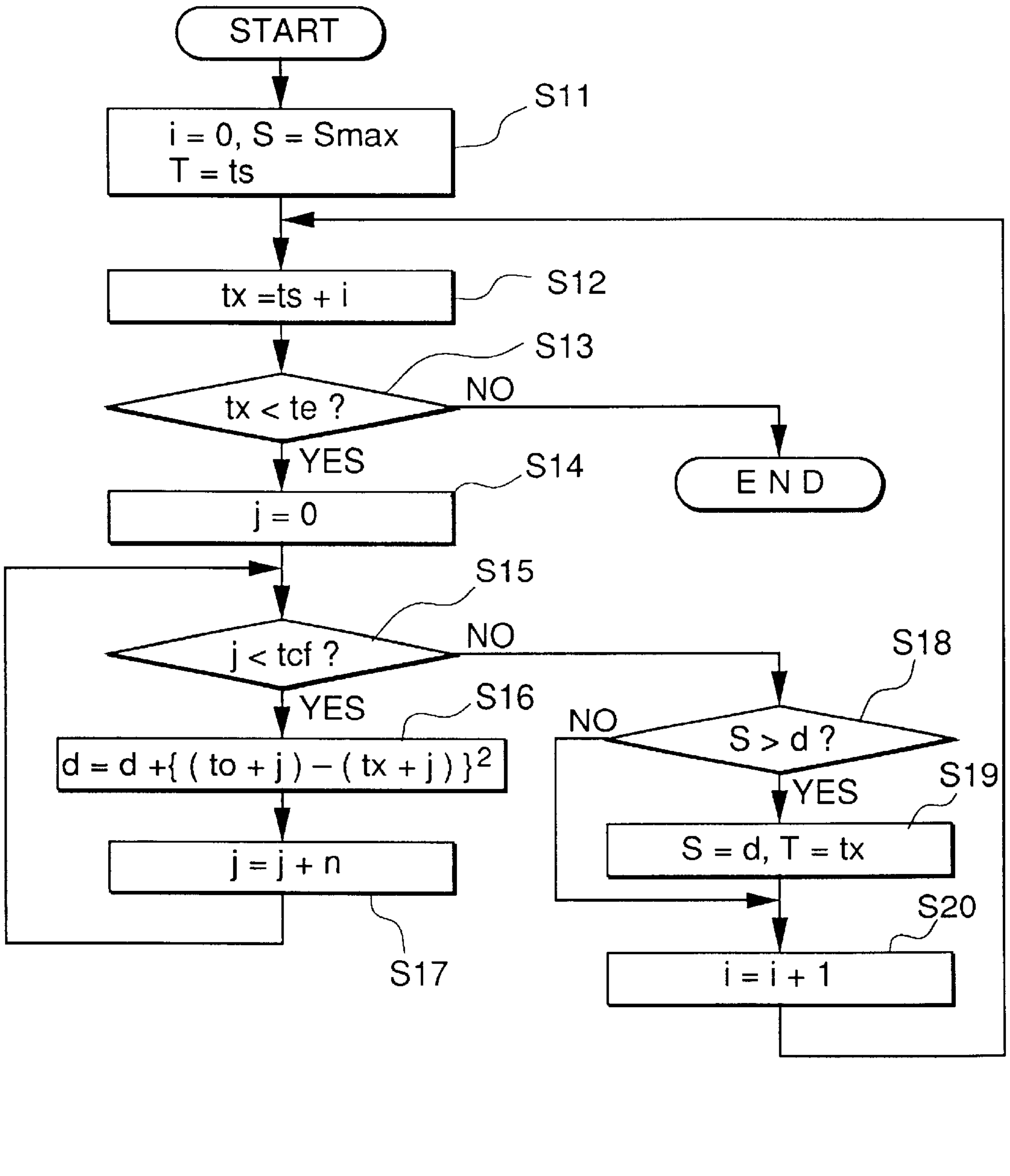
FIG. 6 is a flowchart showing procedures of similarity calculation performed by a similarity calculation section shown in FIG. 1.

FIG. 6 is a flowchart showing procedures of the similarity calculation. In step S11, a search parameter i is reset to "0", an initial value Smax is given as similarity S, and a present position T is set at the search start time ts. In step S12, a cutting position tx is initially set as tx=ts+i. In steps S14 to S17, the similarity calculation section 3 performs calculations while sequentially changing a time parameter j from 0 to tcf in accordance with an equation (5), as follows:

$$d=d+\{(t0+j)-(tx+j)\}^2 \tag{5}$$

In the above, if a calculation result d is smaller than S, the similarity S is updated by d, and the position T is updated by tx in steps S18, S19. By incrementing the search parameter i in step S20, the aforementioned steps starting from the step S12 is repeated with respect to a next cutting position tx. When the cutting position tx newly updated coincides with the search end time te, the similarity calculation section 3 ends the similarity calculation in step S13, in other words, it finally produces a cutting start position (tx) corresponding to a least similarity. Such a cutting start position is stored as T.

As described above, it is possible to produce an appropriate value for the cutting position tx in step S3. Then, the control section 6 proceeds to step S4, wherein it calculates a cutting length Ls used for cutting the original waves to wave segments on the basis of the cutting position tx. The cutting length Ls is stored as a maximal value Nmax in output count. At the same time, the control section 6 instructs the cross-fade section 4 to change over its cross-fade process.

In step S5, the readout position control section 2 sets a specific pointer position (e.g., DP1) of the waveform memory 1 on the basis of the cutting position tx, which is produced by the similarity calculation section 3 in the step S3. As shown in FIGS. 7A, 7B, the waveform memory 1 sets two pointers DP1, DP2 between which a certain offset length $Loff_{i-1}$ lies. That is, data are sequentially read from the waveform memory 1 by using the pointers DP1, DP2 while maintaining the offset length $Loff_{i-1}$ therebetween, wherein the pointer DP2 precedes the pointer DP1. Specifically, in the case of the time-scale compression shown in FIG. 7A, when the preceding pointer DP2 reaches a back-end portion (or cross-fade start position) of a wave segment being cut, the similarity calculation section 3 calculates a next cutting position tx. At this time, the following pointer DP1 that originally moves to follow up with the preceding pointer DP2 to maintain the offset length $Loff_{i-1}$ therebetween jumps to a position of DP1' to provide a new offset length $Loff_i$. Then, the two pointers DP1' and DP2 move together while maintaining the new offset length $Loff_i$ therebetween. In contrast to the time-scale compression of FIG. 7A, FIG. 7B shows the time-scale expansion in which the pointer DP2 jumps in a reverse direction to a position of DP2'. In both cases, two data D1, D2 are respectively read from the waveform memory 1 from positions being designated by the two pointers. The read data D1, D2 are forwarded to the cross-fade section in step S6.

Figure 8A:
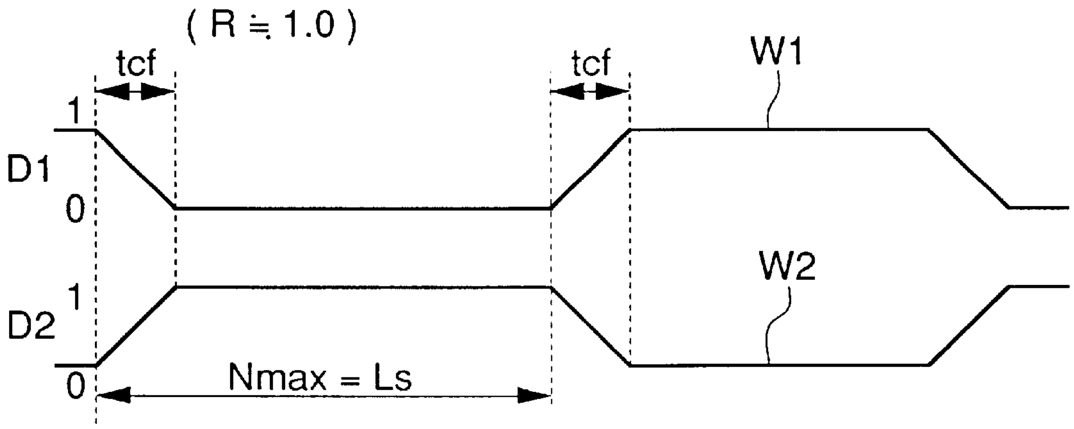
FIG. 8A shows variations of cross-fade coefficients W1, W2 which are used for a cross-fade process when $R \neq 0$.
Figure 8B:
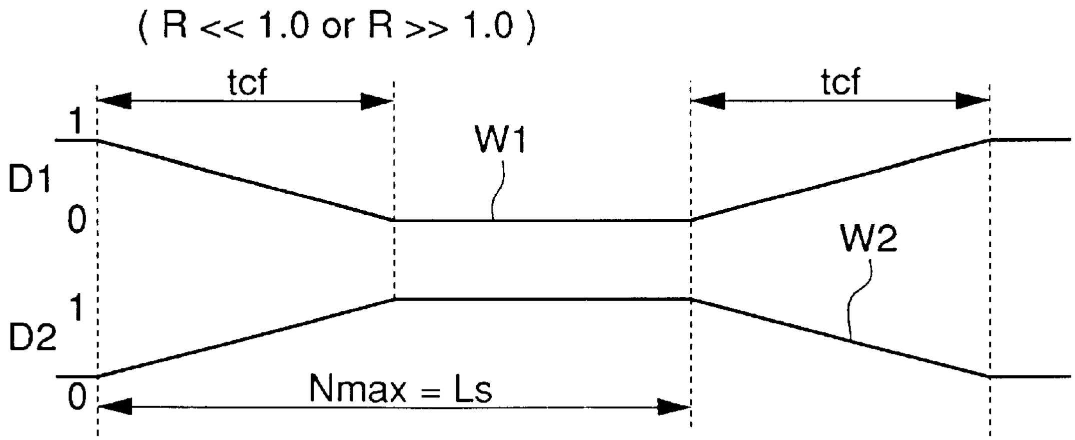
FIG. 8B shows variations of cross-fade coefficients W1, W2 which are used for a cross-fade process when $R<1.0$ or $R>1.0$.
Figure 9A:
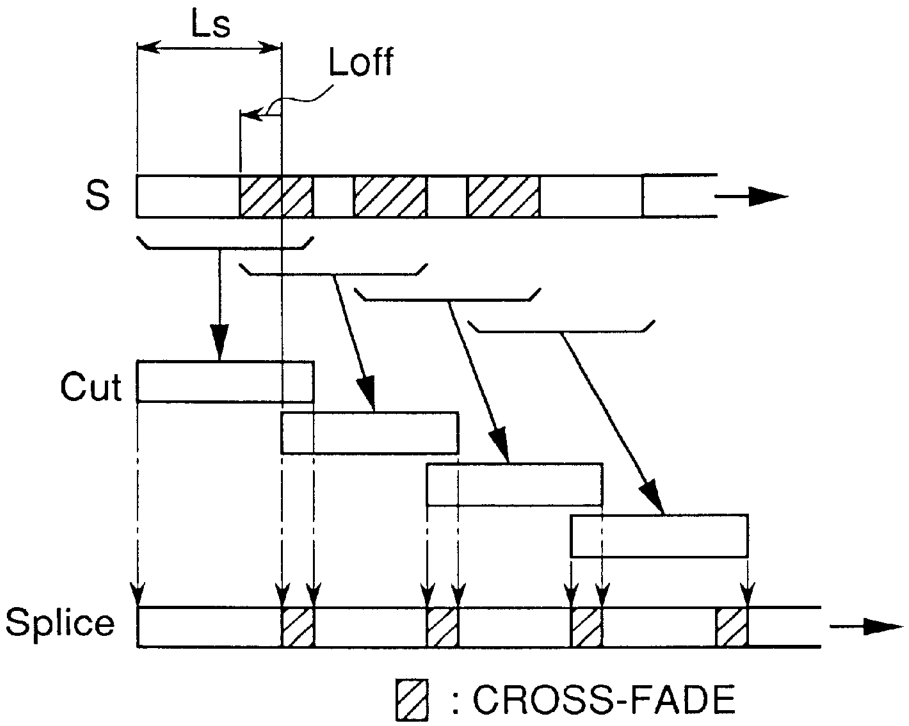
FIG. 9A shows schematic illustrations which are used to explain operations of the conventional time-scale expansion technique.
Figure 9B:
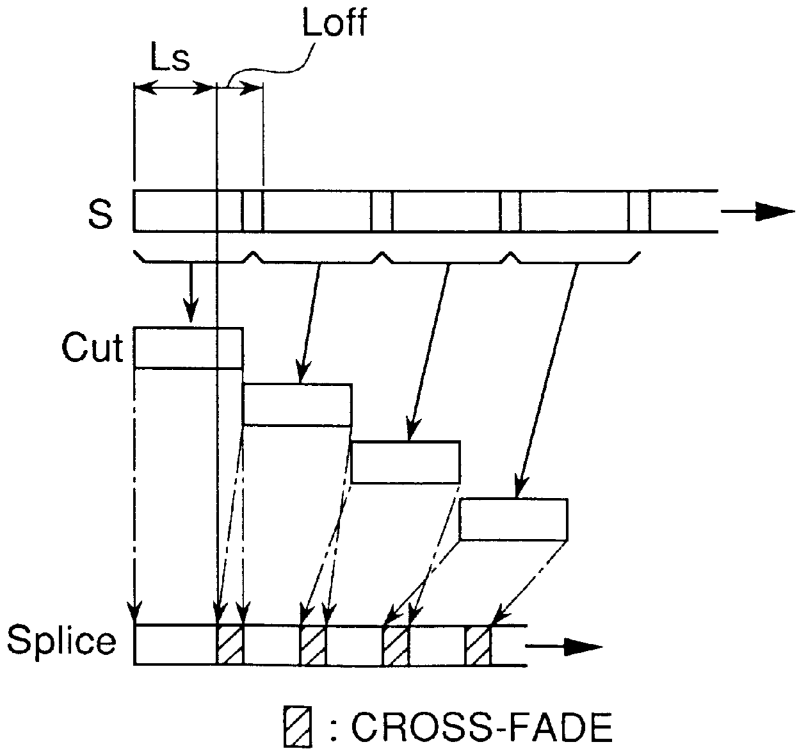
FIG. 9B shows schematic illustrations which are used to explain operations of the conventional time-scale compression technique.

In step S7, the cross-fade section 4 performs a cross-fade mixing process based on the cross-fade duration tcf, which is produced by the control section 6. The present embodiment employs a so-called "trapezoidal window function" as multiplication in the cross-fade process. That is, as shown in FIGS. 8A, 8B, the data D1 is multiplied by a cross-fade coefficient W1, while the data D2 is multiplied by a cross-fade coefficient W2, wherein those coefficients W1, W2 are sequentially varied over a lapse of time in accordance with trapezoidal variable characteristics. Then, the data D1, D2 respectively multiplied by the coefficients W1, W2 are added together to provide mixed data. Herein, the cross-fade coefficients W1, W2 are set in accordance with a relationship of "W1+W2=1.0". Specifically, FIG. 8A shows variations of the cross-fade coefficients W1, W2 when the time-scale modification factor R is very close to "1". FIG. 8B shows variations of the cross-fade coefficients W1, W2 when the time-scale modification factor R is greater than or less than "1", for example, when R=0.5 or R=2.0. The mixed data are forwarded to the output count section 5.

In step S8, the output count section 5 produces a number of output counts "N" in the mixed data, so that the number (referred to as "output count number") "N" is sent to the control section 6. In step S9, the control section 6 makes a decision as to whether the output count number N being increased reaches a maximal number Nmax or not. If the output count number N does not reach the maximal number Nmax, the control section 6 updates the pointers DP1, DP2 respectively in step S10. Thus, the control section 6 reads out a next set of the data D1, D2 in response to the updated pointers DP1, DP2 in step S6, then, the control section 6 repeats the foregoing steps (i.e., S7–S9) to perform the cross-fade process again. When the output count number N reaches the maximal number Nmax in step S9, the waveform memory 1 loads a certain amount of original digital signal waves which are needed for a search of a next cutting position. Thus, the control section 6 repeats the aforementioned steps (i.e., S2–S10) on the digital signal waves loaded in the waveform memory 1.

As described above, the present embodiment searches through the original digital signal waves to find out wave segments whose portions being subjected to cross-fading are very similar to each other, by which a cutting position is being determined. Using the cutting position, appropriate wave segments are cut from the original waves to maintain the designated time-scale modification factor. Thus, it is possible to make smooth connection between the wave segments which are cut and spliced together. As a result, it is possible to actualize a best way of the time-scale modification processing which does not bring a strange feeling on the auditory sense in reproduction of sounds being reproduced from the original digital signals by way of the time-scale modification. In addition, the time-scale modification apparatus of the present embodiment is characterized by changing the cross-fade duration tcf in response to the time-scale modification factor. Hence, even if the compression factor is very small (or expansion factor is very large), it is possible to realize "natural" and "smooth" connection between the wave segments which are cut and spliced together.

Incidentally, the scope of this invention is not necessarily limited by the present embodiment, which is designed to use the trapezoidal window function for the cross-fade process. It is possible to use other window functions using a Gaussian window, a Hamming window, etc. Even if the other window functions are used for the cross-fade processes, it is possible to obtain satisfactory effects, which are similar to those of the present embodiment.

Lastly, this invention can be provided in forms of storage devices or media such as floppy disks, hard disks, memory cards and the like, which store programs and data actualizing functions of the present embodiment. Or, programs and data of the present embodiment can be downloaded to the computer system to actualize the time-scale modification techniques from the computer network such as Internet by way of MIDI terminals, for example.

As described heretofore, this invention has a variety of technical features and effects, which are summarized as follows:

(1) It is possible to dynamically extract optimal cross-fade points based on similarities being calculated between wave segments which are cut and spliced together and which have portions being subjected to cross-fading. The wave segments are spliced together at the cross-fade points. Thus, it is possible to actualize time-scale modification processing in which sound quality is not deteriorated at connections between the wave segments in reproduction.

(2) In other words, an optimal cross-fade point is selected as a cutting start position for cutting a next wave segment to provide a best similarity between wave segments being spliced together by way of cross-fading. This does not cause phase deviations at connections between the wave segments being spliced together. So, it is possible to provide smooth connections between them.

(3) Normally, as the time-scale modification factor becomes far greater or less than "1", similarities between original digital signals and time-scale modified signals become smaller and smaller. This causes an un-natural feeling on the auditory sense when listening to reproduced sounds especially at joints of wave segments spliced together. To cope with such a drawback, this invention is designed to adaptively change the cross-fade duration, by which the wave segments are being spliced together, in response to the time-scale modification factor. That is, it is preferable that as the time-scale modification factor becomes greater or smaller than "1", the cross-fade duration is controlled to be longer.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. In a time-scale modification method in which wave segments each having a prescribed length are sequentially cut from original digital signals and are then spliced together by way of cross-fading so that output signals are produced realizing time-scale modification in accordance with a designated time-scale modification factor, said time-scale modification method comprising the steps of:

determining a cutting start position used for cutting a next wave segment following a present wave segment within a period of time between a search start time and a search end time, which are determined in advance in accordance with the designated time-scale modification factor and where the period of time is less than the predescribed length of each of the wave segments, in such a way that the cutting start position is placed to provide a best similarity between the wave segments having prescribed portions which are connected with each other by way of cross-fading-in response to a cross-fade duration; and using the cutting start position to cut the next wave segment being spliced with the present wave segment by way of the cross-fading in such a manner to maintain the designated time-scale modification factor.

2. A time-scale modification method according to claim 1 wherein the cross-fade duration is controlled to be longer as the time-scale modification factor becomes greater or smaller than "1".

3. A time-scale modification method according to claim 1 wherein sampling intervals are used to sample the original digital signals in a similarity calculation of the wave segments being spliced together by way of the cross-fading, and wherein the sampling intervals are made longer when the cross-fade duration becomes longer, or the sampling intervals are made shorter when the cross-fade duration becomes shorter.

4. A time-scale modification method according to claim 2 wherein sampling intervals are used to sample the original digital signals in a similarity calculation of the wave segments being spliced together by way of the cross-fading, and wherein the sampling intervals are made longer when the cross-fade duration becomes longer, or the sampling intervals are made shorter when the cross-fade duration becomes shorter.

5. A time-scale modification method according to claim 1 wherein the time-scale modification factor is designated to realize compression or expansion of the original digital signals with respect to time.

6. A time-scale modification method according to claim 1 wherein a back-end portion of the present wave segment is spliced together with a top portion of the next wave segment by way of the cross-fading.

7. A time-scale modification method according to claim 1 wherein the cross-fading is actualized by a window function having different cross-fade coefficients, which are varied over a lapse of time and by which data of the prescribed portions of the wave segments are-multiplied and mixed together.

8. A time-scale modification apparatus comprising:

a waveform memory for storing a prescribed amount of original digital signals being subjected to time-scale modification;

a cross-fade section for connecting wave segments, which are cut from the original digital signals stored in the waveform memory, together by way of cross-fading; and a control section for controlling at least a cutting position and a cutting length used for cutting the wave segments to realize the time-scale modification of the original digital signals with a designated time-scale modification factor, wherein the control section calculates time-scale modification parameters including a cross-fade duration, a search start time and a search end time based on the time-scale modification factor to search for a cutting start position for cutting a next wave segment and determines the cutting start position within a period of time between the search start time and the search end time, where the period of time is less than a length of each of the connecting wave segments, to provide a best similarity between the present wave segment and the next wave segment respectively having prescribed portions which are spliced together by way of cross-fading.

9. A time-scale modification apparatus according to claim 8 wherein the cross-fade duration is controlled to be longer as the time-scale modification factor becomes greater or smaller than "1".

10. A time-scale modification apparatus according to claim 8 wherein sampling intervals are used to sample the original digital signals in a similarity calculation of the wave segments being spliced together by way of the cross-fading, and wherein the sampling intervals are made longer when the cross-fade duration becomes longer, or the sampling intervals are made shorter when the cross-fade duration becomes shorter.

11. A time-scale modification apparatus according to claim 8 wherein sampling intervals are used to sample the original digital signals in a similarity calculation of the wave segments being spliced together by way of the cross-fading, and wherein the sampling intervals are made longer when the cross-fade duration becomes longer, or the sampling intervals are made shorter when the cross-fade duration becomes shorter.

12. A time-scale modification apparatus according to claim 8 wherein the time-scale modification factor is designated to realize compression or expansion of the original digital signals with respect to time.

13. A time-scale modification apparatus according to claim 8 wherein a back-end portion of the present wave segment is spliced together with a top portion of the next wave segment by way of the cross-fading.

14. A time-scale modification apparatus according to claim 8 wherein the cross-fading is actualized by a window function having different cross-fade coefficients, which are varied over a lapse of time and by which data of the prescribed portions of the wave segments are multiplied and mixed together.

15. A machine-readable media storing programs and data that cause, when the machine-readable media storing programs are executed, a computer system to perform a time-scale modification method in which wave segments each having a prescribed length are sequentially cut from original digital signals and are then spliced together by way of cross-fading so that output signals are produced realizing time-scale modification in accordance with a designated time-scale modification factor, including:

determining a cutting start position used for cutting a next wave segment following a present wave segment within a period of time between a search start time and a search end time, which are determined in advance in accordance with the designated time-scale modification factor and where the period of time is less than the prescribed length of each of the wave segments, in such a way that the cutting start position is placed to provide a best similarity between the wave segments having prescribed portions which are connected with each other by way of cross-fading in response to a cross-fade duration; and using the cutting start position to cut the next wave segment being spliced with the present wave segment by way of the cross-fading in such a manner to maintain the designated time-scale modification factor.

16. A machine-readable media according to claim 15, wherein the cross-fade duration is controlled to be longer as the time-scale modification factor becomes greater or smaller than "1".

17. A machine-readable media according to claim 15, wherein sampling intervals are used to sample the original digital signals in a similarity calculation of the wave segments being spliced together by way of the cross-fading, and wherein the sampling intervals are made longer when the cross-fade duration becomes longer, or the sampling intervals are made shorter when the cross-fade duration becomes shorter.

18. A time-scale modification method in which waveforms each having a prescribed length are sequentially cut and extracted from original digital signals, which are subjected to time-scale modification, so that cut waveforms are spliced when being cross-faded at both ends thereof so as to produce a time-scale modified output signal that is modified at a designated time-scale modification factor, said time-scale modification method comprising the steps of:

designating a cutting start point of a next waveform to be cut at a point at which cross-faded waveforms become maximally similar to each other in a time period between a search start point and a search end point, which are determined in advance in accordance with the designated time-scale modification factor and where the period of time is less than the prescribed length of each of the waveforms; and cutting the next waveform at the designated cutting start point so as to match an overall time-scale modification factor for the original digital signals with the designated time-scale modification factor.

19. A time-scale modification apparatus comprising:

a waveform storing means for storing waveforms of original digital signals, which are subjected to time-scale modification;

a cross-fade means for splicing the waveforms extracted from the waveform storing means at both ends thereof while being cross-faded; and a control means for controlling at least a cutting start point and a length of the waveform so as to allow the original digital signals to be subjected to time-scale modification as a designated time-scale modification factor, wherein the control means calculates time-scale modification parameters, in accordance with the designated time-scale modification factor, including a search start point and a search end point, a period of time between the search start point and the search end point being less than the length of each of the waveforms, for use in searching of a cutting start point of a next waveform to be cut, and the cutting start point of the next waveform is designated at a point at which cross-faded waveforms become maximally similar to each other in a range between the search start point and the search end point, so that the next waveform is cut at the designated cutting start point so as to match an overall time-scale modification factor with the designated time-scale modification factor.

20. A time-scale modification method in which wave segments each having a prescribed length are sequentially cut from original digital signals and are then spliced together by way of cross-fading so that output signals are produced realizing time-scale modification in accordance with a designated time-scale modification factor, said time-scale modification method comprising the steps of:

determining a cutting start position used for cutting a next wave segment following a present wave segment within a period of time between a search start time and a search end time, which are determined in advance in accordance with the designated time-scale modification factor and where the period of time is less than the prescribed length of each of the wave segments, in such a way that the cutting start position is placed to provide a best similarity between a next wave segment cross-fade portion and a present wave segment cross-fade portion, the present wave segment and the next wave segment connected with each other by way of cross-fading-in response to a cross-fade duration; and using the cutting start position to cut the next wave segment being spliced with the present wave segment by way of the cross-fading in such a manner to maintain the designated time-scale modification factor.

21. A time-scale modification method according to claim 20 wherein the cross-fade duration is controlled to be longer as the time-scale modification factor becomes greater or small than "1".

22. A time-scale modification method according to claim 20 wherein the cross-fading is actualized by a window function having different cross-fade coefficients, which are varied over a lapse of time and by which data of the next wave segment cross-fade portion and the present wave segment cross-fade portion are multiplied and mixed together.

23. A time-scale modification apparatus comprising:

a waveform memory for storing a prescribed amount of original digital signals being subjected to time-scale modification;

a cross-fade section for connecting wave segments, which are cut from the original digital signals stored in the waveform memory, together by way of cross-fading; and a control section for controlling at least a cutting position and a cutting length used for cutting the wave segments to realize the time-scale modification of the original digital signals with a designated time-scale modification factor, wherein the control section calculates time-scale modification parameters, in accordance with the designated time-scale modification factor, including a cross-fade duration, a search start time and a search end time, to search for a cutting start position for cutting a next wave segment and determines the cutting start position within a period of time between the search start time and the search end time, where the period of time is less than the prescribed amount of each of the digital signals, to provide a best similarity between a present wave segment cross-fade portion and a next wave segment cross-fade portion which are spliced together by way of cross-fading.

24. A time-scale modification apparatus according to claim 23, wherein the cross-fade duration is controlled to be longer as the time-scale modification factor becomes greater or smaller than "1".

25. A time-scale modification apparatus according to claim 23, wherein the cross-fading is actualized by a window having different cross-fade coefficients, which are varied over a lapse of time and by which data of the next wave segment cross-fade portion and the present wave segment cross-fade portion are multiplied and mixed together.

26. A machine-readable media storing programs and data that cause, when the machine-readable media storing programs are executed, a computer system to perform a time-scale modification method in which wave segments each having a prescribed length are sequentially cut from original digital signals and are then spliced together by way of cross-fading so that output signals are produced realizing time-scale modification in accordance with a designated time-scale modification factor, including:

determining a cutting start position used for cutting a next wave segment following a present wave segment within a period of time between a search start time and a search end time, which are determined in advance in accordance with the time-scale modification factor and where the period of time is less than the length of the prescribed length of each of the wave segments, in such a way that the cutting start position is placed to provide a best similarity between a next wave segment cross-fade portion and a present wave segment cross-fade portion which are connected with each other by way of cross-fading in response to a cross-fade duration; and using the cutting start position to cut the next wave segment being spliced with the present wave segment by way of the cross-fading in such a manner to maintain the designated time-scale modification factor.

27. A machine-readable medial according to claim 26, wherein the cross-fade duration is controlled to be longer as the time-scale modification factor becomes greater or smaller than "1".

28. A machine-readable media according to claim 26, wherein sampling intervals are used to sample the original digital signals in a similarity calculation of the wave segments being spliced together by way of cross-fading, and wherein the sampling intervals are made longer when the cross-fade duration becomes longer, or the sampling intervals are made shorter when the cross-fade duration becomes shorter.

* * * * *